(12) United States Patent  (10) Patent No.: US 9,189,622 B2
Jawa  (45) Date of Patent: Nov. 17, 2015

(54) STATIC REDIRECTION FOR OBJECTIVE C (71) Applicant: VMware, Inc., Palo Alto, CA (US)

(72) Inventor: Manish Jawa, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/874,451

(22) Filed: Apr. 30, 2013

(65) Prior Publication Data

US 2014/0325499 A1 Oct. 30, 2014

(51) Int. Cl.
*G06F 9/44* (2006.01)
*G06F 9/45* (2006.01)
*G06F 21/54* (2013.01)
*G06F 9/445* (2006.01)
*G06F 11/34* (2006.01)

(52) U.S. Cl.
CPC ............ *G06F 21/54* (2013.01); *G06F 9/44521* (2013.01); *G06F 8/443* (2013.01); *G06F 9/4433* (2013.01); *G06F 11/3466* (2013.01); *G06F 2221/2113* (2013.01)

(58) Field of Classification Search
CPC ..... G06F 9/4433; G06F 9/443; G06F 9/4428; G06F 11/3466; G06F 2201/865; G06F 11/3636; G06F 8/443
See application file for complete search history.

(56) References Cited

U.S. PATENT DOCUMENTS

| | | | |
|---|---|---|---|
| 2009/0204953 A1* | 8/2009 | Swingler et al. | 717/136 |
| 2011/0119653 A1* | 5/2011 | Culpepper | 717/120 |
| 2011/0138373 A1* | 6/2011 | Lane et al. | 717/157 |
| 2012/0240236 A1* | 9/2012 | Wyatt et al. | 726/25 |
| 2012/0304154 A1* | 11/2012 | Cabillic et al. | 717/124 |
| 2013/0091543 A1* | 4/2013 | Wade et al. | 726/1 |
| 2013/0219272 A1* | 8/2013 | Balasubramanian et al. | 715/704 |
| 2013/0239192 A1* | 9/2013 | Linga et al. | 726/7 |
| 2013/0262617 A1* | 10/2013 | Ligman et al. | 709/217 |
| 2013/0318586 A1* | 11/2013 | Smith et al. | 726/7 |
| 2014/0006772 A1* | 1/2014 | Qureshi et al. | 713/150 |
| 2014/0007117 A1* | 1/2014 | Sima et al. | 718/102 |
| 2014/0053234 A1* | 2/2014 | Barton et al. | 726/1 |
| 2014/0058778 A1* | 2/2014 | Mclarty et al. | 705/7.19 |
| 2014/0059525 A1* | 2/2014 | Jawa et al. | 717/162 |
| 2014/0059573 A1* | 2/2014 | Jawa et al. | 719/331 |
| 2014/0059642 A1* | 2/2014 | Deasy et al. | 726/1 |

(Continued)

OTHER PUBLICATIONS

David Chisnall, "A Modern Objective-C Runtime", Jan.-Feb. 2009, vol. 8, No. 1, Journal of Object Technology, pp. 221-240; <http://www.jot.fm>.*

(Continued)

*Primary Examiner* — Thuy Dao
*Assistant Examiner* — Ben C Wang (57) ABSTRACT

Particular embodiments establish static redirection of a function that is a member of a class to an alternate implementation of the function. A software tool executing on a computer server receives an executable file for an application and a location for an alternate implementation of the function. The function may be written in Objective C. The software tool can be used to locate a structure for the function by traversing serialized metadata in the executable file. The software tool can then be used to modify the metadata in the executable file by updating the value of a selector indicating the location of a current implementation of the function to indicate a location of the alternate implementation. The selector may be included in a element of the structure for the class method. Finally, the application may provide the modified executable file for installation on client devices.

20 Claims, 4 Drawing Sheets

(56) References Cited

U.S. PATENT DOCUMENTS

| | | | |
|---|---|---|---|
| 2014/0059703 A1* | 2/2014 | Hung et al. | 726/28 |
| 2014/0108793 A1* | 4/2014 | Barton et al. | 713/165 |
| 2014/0108794 A1* | 4/2014 | Barton et al. | 713/165 |
| 2014/0109072 A1* | 4/2014 | Lang et al. | 717/168 |
| 2014/0109078 A1* | 4/2014 | Lang et al. | 717/172 |
| 2014/0173700 A1* | 6/2014 | Awan et al. | 726/4 |

OTHER PUBLICATIONS

Michael Buckley, "The Case for Message Passing in Swift", Jun. 16, 2014, Buckleyisms.com, pp. 1-5; <http://www.buckleyisms.com/home/2014/6/16/the-case-for-message-passing-in-swift.html>.*

Eagan et al., "Cracking the Cocoa Nut—User Interface Programming at Runtime", 2011 ACM, UIST'11 Oct. 16-19, 2011, pp. 225-234; <http://dl.acm.org/results.cfm?h=1&cfid=691732164&cftoken=57979420>.*

Ortin et al., "Separating Adaptable Persistence Attributes through Computational Reflection", 2004 IEEE, Nov. 8, 2004, vol. 21, Issue 6, pp. 41-49; <http://ieeexplore.ieee.org/stamp/stamp.jsp?tp=&arnumber=1353222&tag=1>.*

"Objective-C Runtime Reference," https://developer.apple.com/library/mac/documentation/Cocoa/Reference/ObjCRuntimeRef/ObjCRuntimeRef.pdf; 79 pp. (see p. 32), Jun. 17, 2010.

\* cited by examiner

STATIC REDIRECTION FOR OBJECTIVE C

BACKGROUND

A user owning a personal mobile device (e.g., smartphone, tablet, etc.) may want to install certain "workplace" mobile applications (e.g., email, calendar, etc.) relating to his work as an employee of a business on his mobile device rather than carry an additional mobile device for work purposes. In situations where an employer permits the user to utilize his personal mobile device to install and run a workspace application, the employer's IT department may need to impose certain security measures or policies on the user's personal device to ensure that enterprise data that is accessed or stored on the personal mobile device is secure. For example, the approaches described in U.S. patent application Ser. No. 13/595,881 filed on Aug. 27, 2012 and entitled "Method and System for Facilitating Isolated Workspace for Applications" (which is hereby incorporated by reference and referred to herein as the "'881 application") utilize a management application locally resident on the mobile device to assist in imposing security policies only around workspace data and applications.

One way of accomplishing this goal is by modifying the workplace application to enforce any such security measures or policies. For example, an application that provides access to workplace email may be modified to require an additional authentication step prior to allowing the user to access such workplace email by asking the user to log in using their work-issued user ID and password. Such modification is a straightforward matter, if the application source code is available to the software developer charged with this task. However, developers typically do not have access to source code to third-party applications of the type that most. In that case, the software developer may find it necessary to modify the executable file for the third-party application.

When modifying an executable file using Objective C, the software developer may use a technique called method swizzling to point to an alternate implementation of a method at runtime. Method swizzling operates by applying introspection to access the default method implementation and then applying reflection to redirect the code to use the alternate implementation of the method. Introspection is a feature of certain programming languages to provide information about objects at runtime, such as names of methods of a class, type information for instance variables of a class, and the actual implementation (code) of methods of a class. Reflection is a feature of certain programming languages that enables a developer to perform a number of operations at runtime, such as adding new classes, adding methods to a class, and adding instance variables to a class. The actual redirection is accomplished by changing the value of a pointer within a structure for the method so that the pointer points to the location of the alternate implementation instead of the location of the default implementation. For example, a third-party developer of an application for the APPLE IOS platform may not have access to the source code for classes provided by the IOS platform, but APPLE IOS currently provides a function to redirect the selector for a method (i.e., the value of the element in the method structure that indicates the location of the implementation of the method) to point to an alternate implementation: method_exchangeImplementations (Method original, Method new)). However, if introspection and reflection are not supported or simply not available, an alternate technique to achieve redirection of method calls at runtime may be desirable.

SUMMARY

Particular embodiments establish static redirection of a function that is a member of a class to an alternate implementation of the function. A software tool executing on a computer server receives an executable file for an application and a location for an alternate implementation of the function. The alternate implementation of the function may operate, when executed, to enforce security measures or policies when the modified executable file is launched from a client device. The function may be written in Objective C. The software tool may be used to locate a structure for the function by traversing serialized metadata in the executable file. For each pair of structures serially traversed, the software tool may inspect a first structure defined in the serialized metadata to determine a value of a specific element, wherein the value is an offset indicating a location in the executable file of a second structure. The software tool may then be used to modify the metadata in the executable file by updating the value of a selector indicating the location of a current implementation of the function to indicate a location of the alternate implementation. The selector may be included in an element of the structure for the class method. The software tool may alternately write compiled code for the alternate implementation into available space at a location within the executable file. The software tool may also package compiled code for the alternate implementation into a library, and inject the library into the executable file. Finally, the computer server may provide the modified executable file for installation on client devices. The computer server may provision the modified executable file to the client devices by over-the-air transmission, an email, a Uniform Resource Locator (URL), or a direct physical connection.

DETAILED DESCRIPTION

Figure 1:
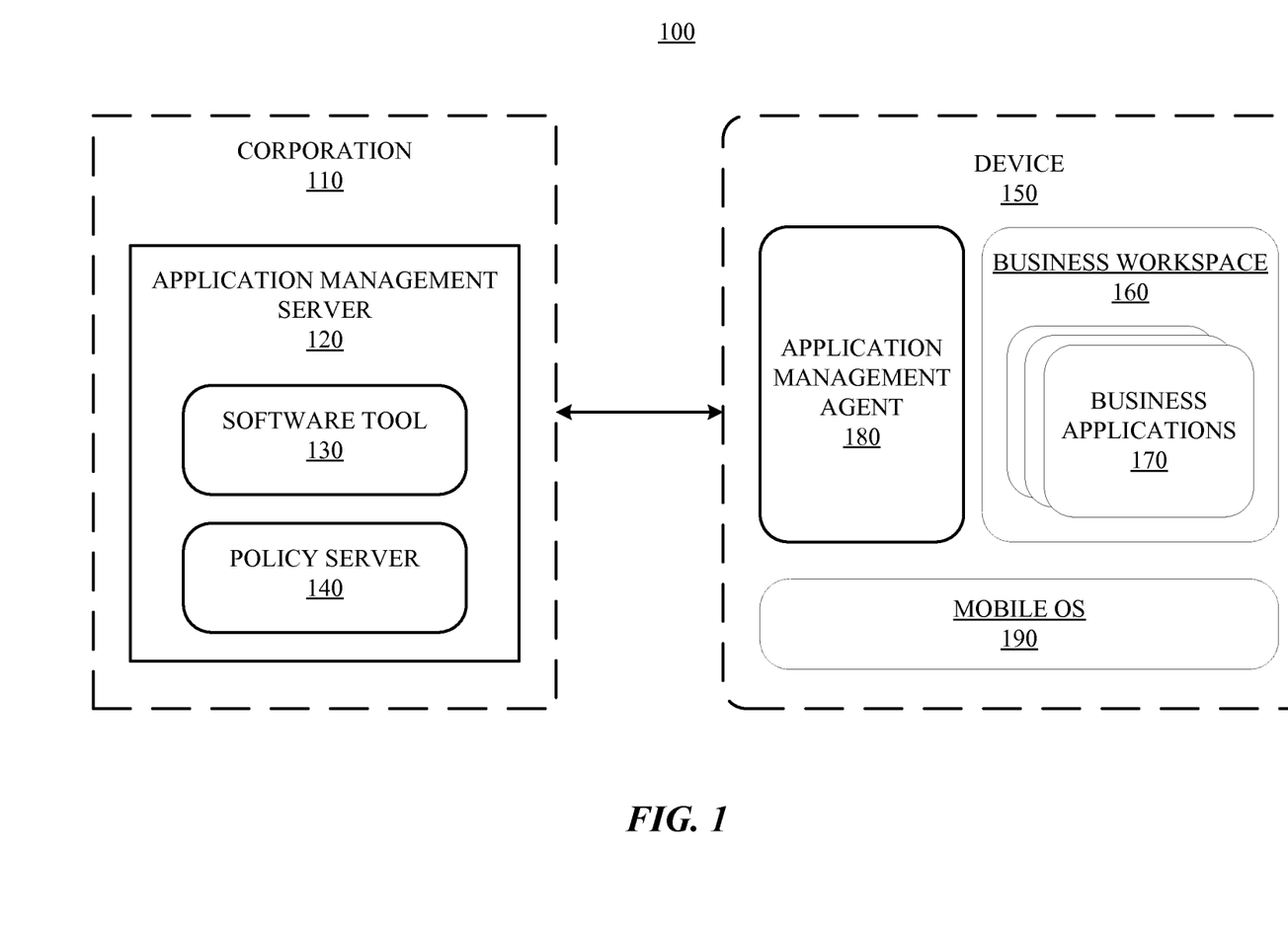
FIG. 1 depicts an example computing environment in which embodiments herein may be practiced.

FIG. 1 depicts an example computing environment 100 in which embodiments described herein may be implemented. An application management server 120 runs within a corporation 110 and manages deployment of workplace-related applications (e.g., email) to enable employees to utilize a business "workspace" 160 consisting, for example, of a number of corporate-approved mobile applications 170 that can be installed on an employee's personal mobile device 150. In the embodiment as depicted in FIG. 1, software tool 130 and policy server 140 are components or parts of an application management server 120 similar to the application management server further described in the '881 Application that runs within corporation 110 with an application management agent 180 that is installed on mobile device 150 in order to manage the use of various applications 170 in business workspace 160 in a secure fashion. Policy server 140 may be configured, for example, to validate authentication credentials transmitted by a mobile OS 190 of mobile device 150 (e.g., for Mobile Device Management (MDM) purposes, etc).

In particular embodiments, a developer uses a software tool, such as a post-build software tool 130 deployed on application management server 120, to modify an executable file for an application (e.g., a binary provided by a third party) to modify the application prior to distribution or launch. In an example use case, the developer may work for an Information Technology (IT) department of a large corporation 110 that wants to distribute to its employees a version of the standard email application for APPLE IOS devices that has been modified to enforce additional security measures and/or policies, such as, by way of example and not limitation, restrictions on access to data, business-related applications, or other resources installed on or accessible from the client device, wherein such applications or resources are configured to access data managed by the corporation. The developer may develop an alternate implementation of one or more methods that are called at the time the email application is launched on a client device, install software tool 130 on application management server 120, and then use software tool 130 to modify the executable file to incorporate the alternate implementation and establish static redirection to call the alternate implementation once the email application is installed and launched on a client device. Once the executable file has been modified, the policy server 140 makes the modified application available for distribution to users of client devices (e.g., sending a notification to the client devices regarding the availability of "over-the-air" (OTA) distribution for the application). After the modified application has been installed on a client device (e.g., APPLE's IPHONE 5), upon launch, the modified application will call the alternate implementation in accordance with the static redirection and execute operations to enforce the additional security measures and/or policies (e.g., requiring the user to log in with their workplace credentials) in relation to the modified application.

Software tool 130 applies static redirection of the code (by modifying the executable file) to eliminate any reliance on being provided with a programming language and runtime environment that support introspection and reflection, which would be necessary to implement dynamic redirection at runtime. The mechanics of applying static redirection is similar to method swizzling: software tool 130 changes the value of a pointer within a structure for the method so that the pointer points to the location of the alternate implementation instead of the location of the default implementation.

In order to change the value of the pointer to the implementation of the method, software tool 130 must first traverse metadata in the executable file to find the pointer. For example, an example email application may instantiate an object for an emailApplicationUIDelegate class (a delegate of the singleton UIApplication object that implements methods declared by the UIApplicationDelegate protocol) that launches an email application. In accordance with the UIApplicationDelegate protocol, the emailApplicationUIDelegate class implements a method didFinishLaunchingWithOptions that is called when the application finishes launching—after state restoration has occurred, but before the application's window and other UI have been presented. The developer may want to change the implementation of didFinishLaunchingWithOptions so that a user of the application is required to enter their workplace authentication credentials, thus providing an extra layer of security before access to workplace email is allowed. Since the developer lacks access to the source code for the application, the developer cannot simply override the didFinishLaunchingWithOptions method with an alternate implementation. However, using embodiments of software tool 130 described herein, the developer is able to modify the compiled executable code so as to redirect the selector for the didFinishLaunchingWithOptions method to the alternate implementation.

Figure 2:
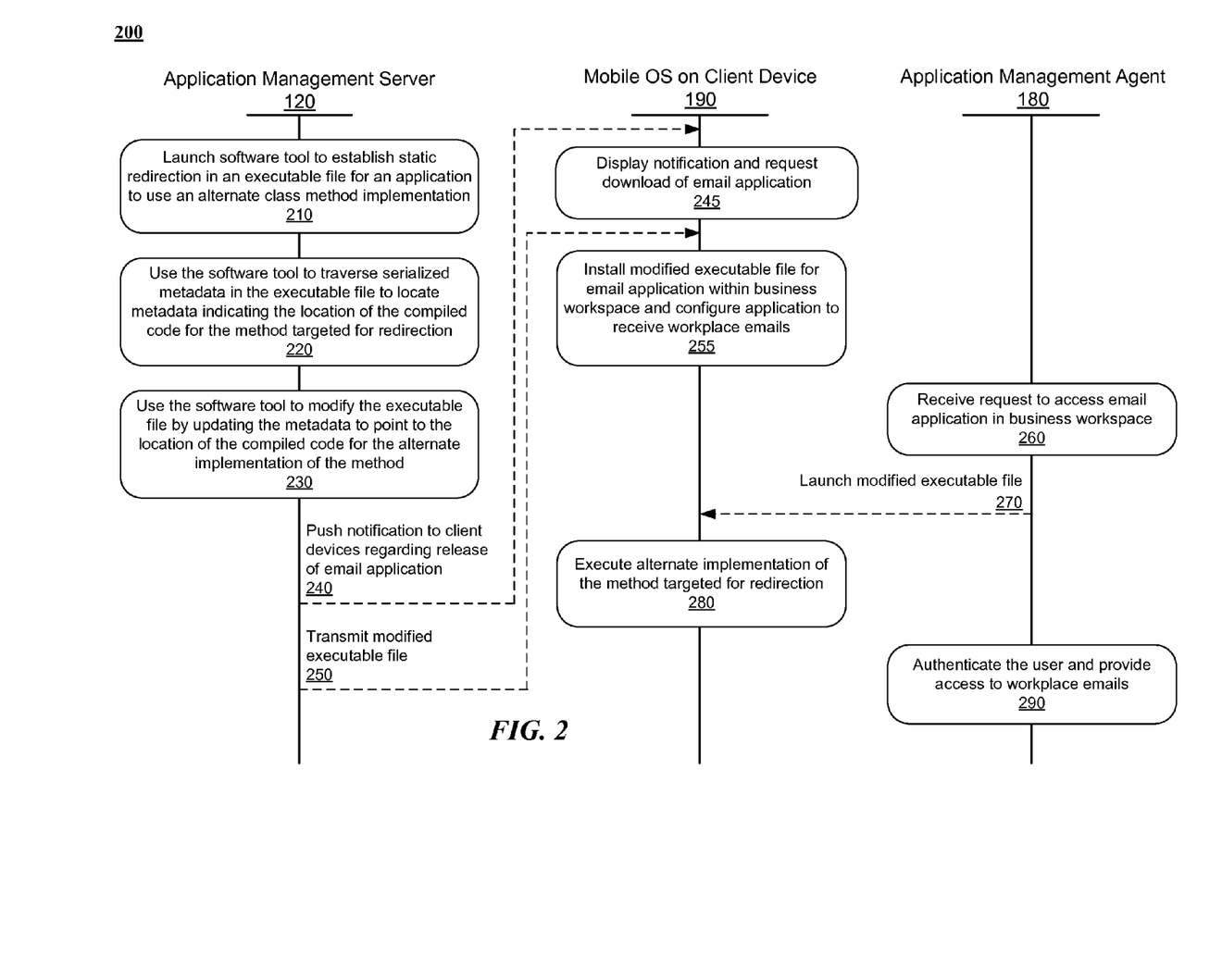
FIG. 2 is a flowchart of an example method of using a post-build software tool to redirect executable code to an alternate method implementation at runtime.

FIG. 2 is a flowchart of an example method of using a post-build software tool to redirect executable code to an alternate method implementation at runtime. In step 210, application management server 120 launches software tool 130 to establish static redirection of instructions in a compiled Objective C executable file in order to use an alternate implementation of a particular method of a class. The executable file includes metadata describing elements of a software program, including classes, methods, properties, protocols, instance variables, etc. The executable file may be linked to one or more library files including one or more additional elements to be used with the software program. The alternate implementation of the method may be located in any appropriate location, such as, for example, a separate file that is identified in the command, a library file, or a location in the executable file itself.

In step 220, application management server 120 uses software tool 130 to traverse a series of related structures (e.g., ClassList, Class, MethodList, Method) described in serialized metadata in the executable file to locate the structure for the method targeted for redirection, which includes a pointer (IMP field) to the executable code for the method implementation. In order to traverse the metadata efficiently and locate the method targeted for redirection, the structures in the metadata may be represented by nodes in a graph, wherein the nodes are connected by edges representing the set of all possible paths to traverse the metadata while inspecting the structures. Using the graph representation, the metadata may then be traversed using conventional algorithms for searching for a node in a cyclic directed graph (e.g., the A* algorithm).

Figure 3A:
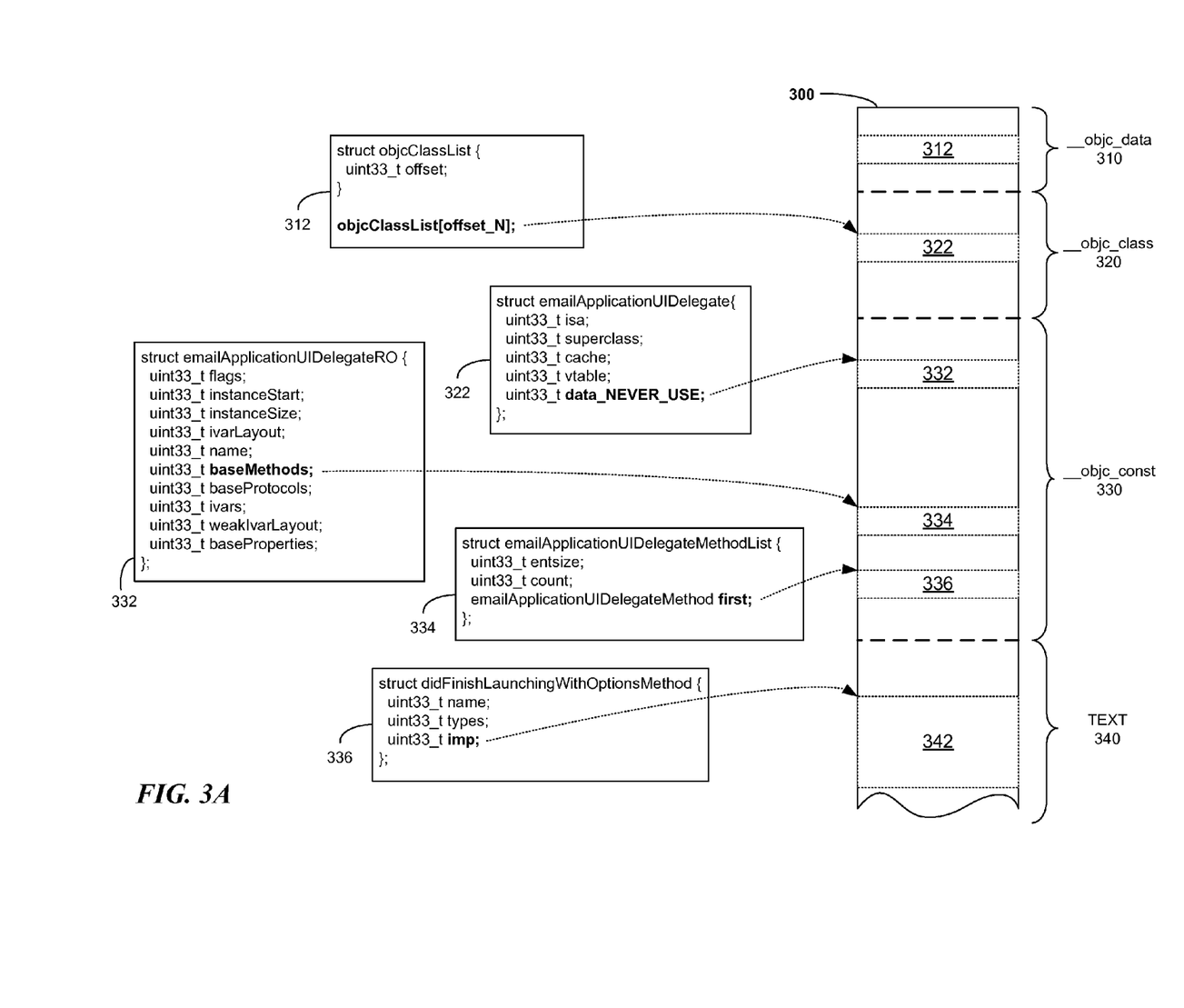
FIGS. 3A-B are example diagrams illustrating traversal of serialized metadata in an executable file compiled from Objective C programming code.

FIG. 3A is an example diagram illustrating traversal of a graph structure representing serialized Objective C metadata 300 in an executable file. The metadata 300 in the executable file is organized into sections, wherein each section corresponds to metadata for a particular type of objective C construct (e.g., classes, methods, properties, protocols, instance variables, etc.). Each section of metadata 300 may have a name starting with a particular prefix, such as "_objc_" (e.g., "_objc_data", "_objc_classlist", "_objc_const"), as well as a section "TEXT" including compiled code for method implementations. Each section of metadata 300 includes structures defining constructs, such as classes, methods, properties, etc. Within the serialized metadata 300, each structure that defines an Objective C construct that references another construct (e.g., structure defining a class that references a structure defining a list of class methods) includes an element with a pointer to the offset in the executable file where the referenced structure is located.

The software tool begins traversing section 310 ("_objc_data") in metadata 300, which includes a structure 312 ("_objcClassList"). Structure 312 represents an array of integers, wherein each integer value is an offset indicating a location in a section 320 ("_objc_classlist") of the executable file. At each of those locations, there can be found a structure defining a class. The software tool finds the offset ("offset_N") corresponding to the class (emailApplicationUIDelegate) of which the target method (didFinishLaunchingWithOptions) is a member and jumps to that location in the executable file to inspect structure 322 that defines that class.

The structure 322 for the class emailApplicationUIDelegate may include a number of elements, including an element ("data_NEVER_USE") whose value is an offset indicating the location in section 330 ("_objc_const") of metadata 300—at this location can be found a structure 332

("emailApplicationUIClassRO") that represents metadata for the class emailApplicationUIDelegate. The software tool jumps to this location in the executable file to inspect structure 332.

Structure 332 includes a number of elements, including an element ("baseMethods") whose value is an offset indicating the location in section 330 of a structure 334 ("emailApplicationUIMethodList") that represents a list of methods defined for the class emailApplicationUIDelegate. The software tool jumps to this location in the executable file to inspect structure 334.

Structure 334 may include an element ("first") whose value is an offset indicating the location in section 330 of the beginning of a list of structures defining methods of the class emailApplicationUIDelegate. By traversing this list, software tool 130 can find the structure 336 that defines the method targeted for redirection ("didFinishLaunchingWithOptionsMethod"). The software tool jumps to this location in the executable file to inspect structure 336.

Structure 336 includes a element ("imp") whose value is an offset indicating a location in section 340 ("TEXT") of metadata 300—at this location can be found the beginning of the compiled code 342 for the original implementation of the target method.

Figure 3B:
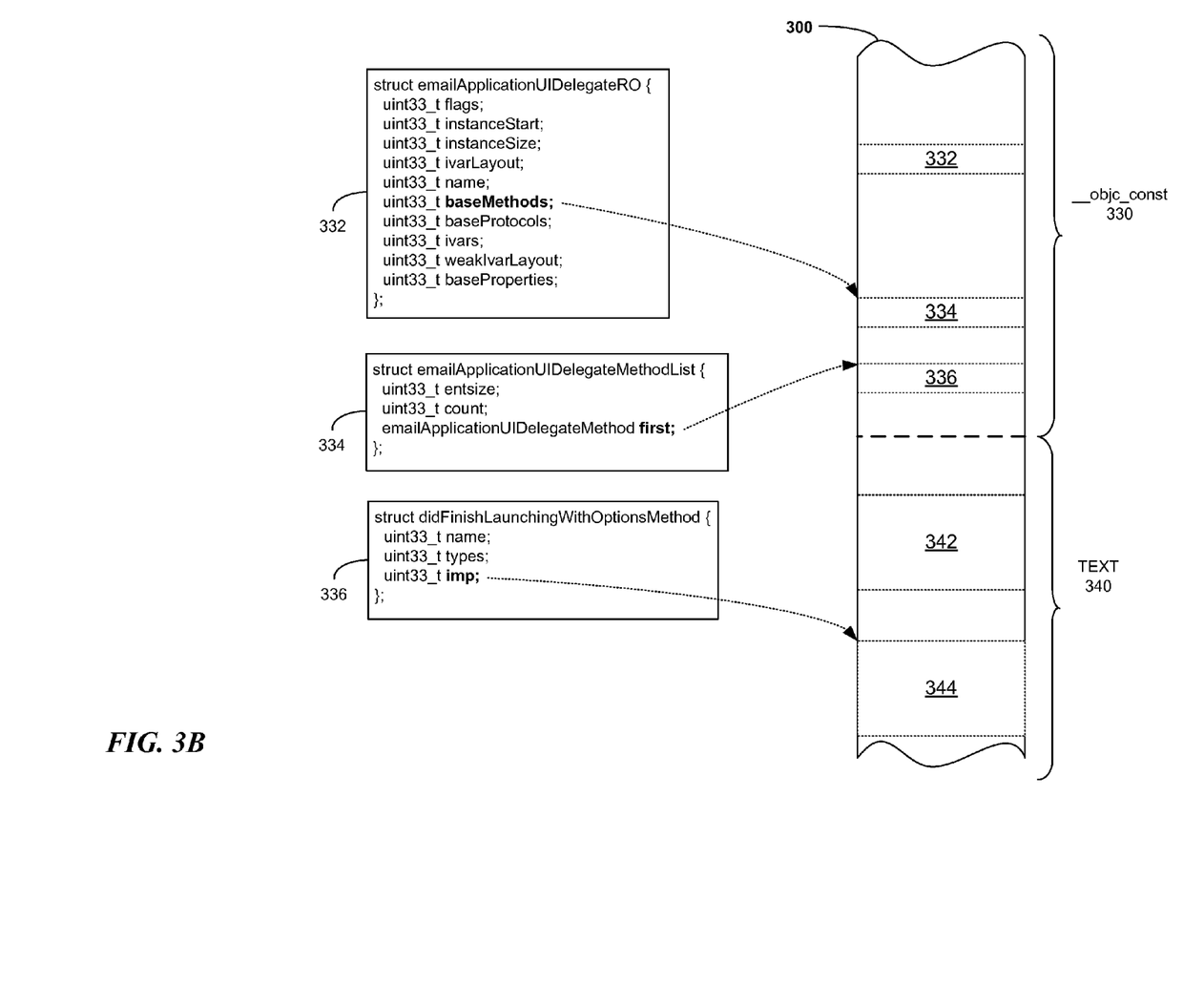

In step 230, software tool 130 updates the IMP field in structure 336 in the metadata to point to the location 344 of the alternate implementation, as shown in FIG. 3B. The alternate implementation may have been compiled into a library that was injected into the executable (e.g., by modifying the list of load commands LC_LOAD_COMMANDS to add a LC_LOAD_DYLIB entry pointing to the injected library).

In step 240, the developer makes the modified email application available for distribution and/or distributes the application to users of client devices, e.g., by using policy server 140 to send a notification to the client devices regarding the availability of "over-the-air" (OTA) distribution for the email application. In step 245, mobile OS 190 on client device 150 receives the notification and displays the notification to the user. If client device 150 has been configured to install workplace applications automatically, client device 150 requests a download of the email application. In step 250, in response to the request for a download, policy server 140 transmits the modified executable file to the client device (e.g., IPHONE 5).

In step 255, after client device 150 receives the modified executable file, mobile OS 190 may install the modified executable file for the email application on client device 150 within business workspace 160 and configure application to receive workplace emails.

In step 260, the application management agent 180 receives a request to access the email application in the business workspace, and then launches the modified application (step 270). When mobile OS 190 handles the call to the redirected method didFinishLaunchingWithOptions. In accordance with the static redirection that was established by updating the IMP field in structure 336 to point to the location 344 in the executable file of the alternate implementation of didFinishLaunchingWithOptions, mobile OS 290 executes the alternate implementation (step 280), rather than the original implementation.

Since the alternate implementation was called, in step 290, the application requests application management agent 180 to execute operations to require the user to present their workplace authentication credentials. If the user can be authenticated using their credentials, the alternate implementation of didFinishLaunchingWithOptions allows the application to proceed with its usual routines to present the email application interface; otherwise, if the user cannot be authenticated, the alternate implementation of didFinishLaunchingWithOptions may present an error message and/or prevent access to the application.

Although one or more embodiments of the present invention have been described in some detail for clarity of understanding, it will be apparent that certain changes and modifications may be made within the scope of the claims. For example, where it is desirable to preserve the original implementation of the method, the alternate, pre-compiled implementation of the method may be written into available space within the TEXT field of the section including the metadata for the structure for the method in the executable file, in which case, the software tool simply updates the IMP field to point to the location where the code for the alternate implementation begins; in some cases, the software tool may expand the available space in the TEXT field prior to writing the alternate implementation of the method into the available space. In another example, the alternate, pre-compiled implementation of the method may be used to overwrite the currently existing implementation. In another example, while embodiments herein have referred to certain operating systems such as APPLE IOS, it should be recognized that any operating systems may be utilized in alternate embodiments such as APPLE'S IOS, RESEARCH IN MOTION'S BLACKBERRY OS, MICROSOFT'S WINDOWS PHONE, HEWLETT PACKARD'S WEBOS, SYMBIAN, JAVA, and the like. It should further be recognized that use of certain terminology that may be more commonly used with certain operating systems than others is merely exemplary not meant to limit the scope of the teachings herein to any particular operating system and that corresponding functions and components in other operating system platforms may benefit from the teachings herein. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Disc)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method to establish static redirection of a function that is a member of a class to an alternate implementation of the function, the method comprising using a processor configured to perform operations to:

receive, by a software tool executing on a computer server, an executable file for an application and a first location for an alternate implementation of the function, the function being written in Objective C;

locate, by the software tool, a structure for the function by traversing serialized metadata in the executable file;

modify, by the software tool, the metadata in the executable file by updating a value of a selector indicating a second location of a current implementation of the function to indicate the first location of the alternate implementation, the selector being included in an element of the structure for the function; and provide, by the software tool, the modified executable file for installation on client devices.

2. The method of claim 1, the processor configured to perform further operations to, for each pair of structures serially traversed:

inspect a first structure defined in the serialized metadata to determine a value of a specific element, wherein the value is an offset indicating a location in the executable file of a second structure.

3. The method of claim 1, the processor configured to perform further operations to write compiled code for the alternate implementation into available space at a location within the executable file.

4. The method of claim 1, the processor configured to perform further operations to:

package compiled code for the alternate implementation into a library; and inject the library into the executable file.

5. The method of claim 1, wherein the alternate implementation of the function operates, when executed, to enforce security measures or policies when the modified executable file is launched from a client device.

6. The method of claim 1, wherein the security measures or policies comprise restrictions on access to a plurality of business-related applications installed on the client device, wherein the applications are configured to access data managed by an employer of an owner of the client device.

7. The method of claim 1, the processor configured to perform further operations to provision the modified executable file to the client devices by over-the-air transmission, an email, a Uniform Resource Locator (URL), or a direct physical connection.

8. One or more computer-readable non-transitory storage media embodying software to establish static redirection of a function that is a member of a class to an alternate implementation of the function, the mobile device comprising a processor configured to execute the software, the software being operable when executed to:

receive, by a software tool executing on a computer server, an executable file for an application and a first location for an alternate implementation of the function, the function being written in Objective C;

locate, by the software tool, a structure for the function by traversing serialized metadata in the executable file;

modify, by the software tool, the metadata in the executable file by updating a value of a selector indicating a second location of a current implementation of the function to indicate the first location of the alternate implementation, the selector being included in an element of the structure for the function; and provide, by the software tool, the modified executable file for installation on client devices.

9. The media of claim 8, the software being further operable when executed to, for each pair of structures serially traversed:

inspect a first structure defined in the serialized metadata to determine a value of a specific element, wherein the value is an offset indicating a location in the executable file of a second structure.

10. The media of claim 8, the software being further operable when executed to write compiled code for the alternate implementation into available space at a location within the executable file.

11. The media of claim 8, the software being further operable when executed to:

package compiled code for the alternate implementation into a library; and inject the library into the executable file.

12. The media of claim 8, wherein the alternate implementation of the function operates, when executed, to enforce security measures or policies when the modified executable file is launched from a client device.

13. The media of claim 8, wherein the security measures or policies comprise restrictions on access to a plurality of business-related applications installed on the client device, wherein the applications are configured to access data managed by an employer of an owner of the client device.

14. The media of claim 8, the software being further operable when executed to provision the modified executable file to the client devices by over-the-air transmission, an email, a Uniform Resource Locator (URL), or a direct physical connection.

15. A computer server comprising a processor and a local storage, the processor configured to execute software to establish static redirection of a function that is a member of a class to an alternate implementation of the function, the software being operable when executed to:

receive, by a software tool executing on the computer server, an executable file for an application and a first location for an alternate implementation of the function, the function being written in Objective C;

locate, by the software tool, a structure for the function by traversing serialized metadata in the executable file;

modify, by the software tool, the metadata in the executable file by updating a value of a selector indicating a second location of a current implementation of the function to indicate the first location of the alternate implementation, the selector being included in an element of the structure for the function; and provide, by the software tool, the modified executable file for installation on client devices.

16. The computer server of claim 15, the software being further operable when executed to, for each pair of structures serially traversed:

inspect a first structure defined in the serialized metadata to determine a value of a specific element, wherein the value is an offset indicating a location in the executable file of a second structure.

17. The computer server of claim 15, the software being further operable when executed to write compiled code for the alternate implementation into available space at a location within the executable file.

18. The computer server of claim 15, the software being further operable when executed to:

package compiled code for the alternate implementation into a library; and inject the library into the executable file.

19. The computer server of claim 15, wherein the alternate implementation of the function operates, when executed, to enforce security measures or policies when the modified executable file is launched from a client device.

20. The computer server of claim 15, wherein the security measures or policies comprise restrictions on access to a plurality of business-related applications installed on the client device, wherein the applications are configured to access data managed by an employer of an owner of the client device.

* * * * *